Figure 1:
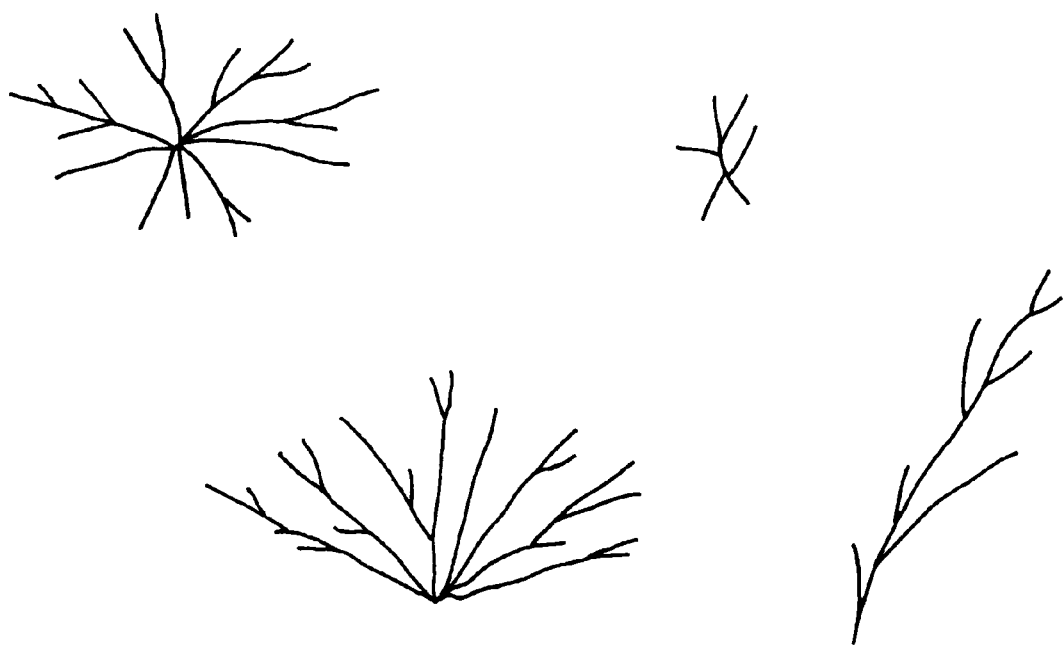

United States Patent
Saito et al.

[11] Patent Number: 6,090,907
[45] Date of Patent: Jul. 18, 2000

[54] POLYCARBONATE RESIN COMPOSITION AND MOLDED ARTICLE CONSISTING OF THE SAME

[75] Inventors: Akihiro Saito; Shinichi Yamaguchi, both of Utsunomiya, Japan

[73] Assignee: General Electric Company, Schenectady, N.Y.

[21] Appl. No.: 09/160,402

[22] Filed: Sep. 25, 1998

[30] Foreign Application Priority Data

Sep. 30, 1997 [JP] Japan ..................... 9-282683

[51] Int. Cl.[7] .................................................. C08G 64/00
[52] U.S. Cl. ........................................ 528/198; 528/196
[58] Field of Search .................... 528/196, 198

[56] References Cited

U.S. PATENT DOCUMENTS

| | | | |
|---|---|---|---|
| 3,169,121 | 2/1965 | Goldberg | 528/196 |
| 4,005,057 | 1/1977 | Singh et al. | 528/196 |
| 4,038,258 | 7/1977 | Singh et al. | 428/373 |
| 4,093,589 | 6/1978 | Factor et al. | 528/196 |
| 4,238,596 | 12/1980 | Quinn | 528/179 |
| 4,238,597 | 12/1980 | Markezich et al. | 528/176 |
| 4,735,978 | 4/1988 | Ishihara | 528/196 |
| 4,943,380 | 7/1990 | Suigiura et al. | 252/8.7 |
| 5,026,817 | 6/1991 | Sakashita et al. | 528/199 |
| 5,468,793 | 11/1995 | Ward et al. | 524/159 |
| 5,468,973 | 11/1995 | Harada et al. | 257/33 |
| 5,486,555 | 1/1996 | Hirata et al. | 524/83 |
| 5,668,202 | 9/1997 | Hirata et al. | 524/154 |

FOREIGN PATENT DOCUMENTS

| | | |
|---|---|---|
| 2124934 | 5/1990 | Japan . |
| 640 646 | 3/1995 | Japan . |
| 9230552 | 9/1997 | Japan . |
| 63215763 | 9/1998 | Japan . |

OTHER PUBLICATIONS

Abstract of Japanese patent No. JP 5171024 issued Jul. 9, 1993.

*Primary Examiner*—Terressa Mosley

[57] ABSTRACT

The present invention provides a polycarbonate (PC) resin composition which tends not to show amorphous-pattern contamination on the surfaces of molded articles, and is superior in terms of transparency, mechanical strength and weather resistance, etc. The PC resin composition contains (A) 100 parts by weight of a polycarbonate resin and (B) 0.0001 parts by weight or more, but less than 0.1 parts by weight, of a sulfonic acid phosphonium salt. Furthermore, the present invention also provides a PC resin composition which additionally contains (C) 0.01 to 10 parts by weight of an ultraviolet absorbing agent.

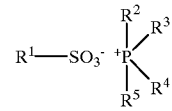

16 Claims, 1 Drawing Sheet

6,090,907

POLYCARBONATE RESIN COMPOSITION AND MOLDED ARTICLE CONSISTING OF THE SAME

The present invention concerns a polycarbonate (hereafter referred to as "PC") resin composition and a molded article consisting of the same.

PC resins are superior in terms of transparency, heat resistance and mechanical strength, and are therefore used in various fields. For example, PC resins are used in applications such as automobile head lamp lenses, covers and lenses for various illuminating devices, transparent films and transparent sheets, optical disks and optical disk cartridges, various parts used in office equipment and household appliances, and case materials used for storage or transportation, etc.

However, molded articles consisting of PC resins suffer from the problem of contamination with fine dust from the outside during use. Such contamination is not uniform overall; instead, areas where contaminants tend to adhere and areas where contaminants tend not to adhere form a non-uniform amorphous pattern, e. g., a fern leaf pattern or tree branch pattern as shown in FIG. 1. As time passes, the contaminated areas become more conspicuous, thus damaging the commercial value of the molded article.

For example, Japanese Examined Patent Application No. Hei 7-39537 discloses a composition in which a sulfonic acid phosphonium salt and a phosphorous acid ester are mixed with a PC resin as a method of improving the anti-static properties of such a PC resin. Here, the sulfonic acid phosphonium salt is added at the rate of 0.1 to 20 parts by weight per 100 parts by weight of PC resin. In the abovementioned patent, it is considered that an anti-static effect cannot be obtained if the amount added is less than 0.1 parts by weight.

The object of the present invention is to provide a polycarbonate resin composition which tends to prevent contamination in an amorphous pattern on the surfaces of molded articles, and which is superior in terms of transparency, weather resistance and mechanical strength.

FIG. 1 shows examples of shapes of amorphous-pattern contamination formed on the surfaces of molded articles.

The present inventors conducted diligent research concerning the prevention of contamination in molded articles consisting of PC resin compositions. As a result, the inventors made the following discovery: i. e., in cases where a sulfonic acid phosphonium salt is added to a PC resin, the weather resistance is lost if the amount added is too large. Accordingly, it was found that if an extremely small amount of a sulfonic acid phosphonium salt which would not conventionally be considered sufficient to provide an anti-static effect is added to a PC resin, not only is there no loss of transparency, weather resistance or mechanical strength, but surprisingly, the formation of contamination in an amorphous pattern is also suppressed. This discovery led to the perfection of the present invention.

Specifically, the resin composition of the present invention is characterized by the fact that said compositions consists of (A) 100 parts by weight of a polycarbonate resin and (B) 0.0001 parts by weight or more, but less than 0.1 parts by weight, of a sulfonic acid phosphonium salt. The fact that contamination of PC resin molded articles in an amorphous pattern can thus-be alleviated by the addition of an extremely small amount of a sulfonic acid phosphonium salt that would not be considered sufficient to provide an anti-static effect is something that could not have been predicted. Accordingly, it appears that the effect of sulfonic acid phosphonium salts in suppressing the formation of amorphous-pattern contamination in the present invention is based on a different mechanism from the conventional effect of providing anti-static properties.

The present invention also discloses a resin composition which includes (C) an ultraviolet absorbing agent in addition to the two components mentioned above. Conventionally, in the case of resin compositions containing (A) a PC resin and (C) an ultraviolet absorbing agent, the following problem has been encountered, i. e., when (B) a sulfonic acid phosphonium salt is added in order to prevent static electricity, the weather resistance drops conspicuously. However, it has been found that in cases where an extremely small amount of a sulfonic acid phosphonium salt is added as described above, amorphous-pattern contamination of molded articles can be alleviated without any loss of weather resistance.

In the present invention, aromatic polycarbonates manufactured by the universally known phosgene method or melt method, for example, see Japanese Unexamined Patent Application Disclosure No. Sho 63-215763 and Japanese Unexamined Patent Application Disclosure No. Hei 2-124934, can be used as the abovementioned (A) polycarbonate resin. Polycarbonate resins consist of a carbonate component and a diphenol component. Examples of precursor substances which can be used to introduce the carbonate component include phosgene and diphenyl carbonate, etc. Furthermore, examples of suitable diphenols include 2,2-bis (4-hydroxyphenyl)propane (so-called "bisphenol A" or "BPA"); 2,2-bis(3,5-dibromo4-hydroxyphenyl)propane; 2,2-bis(3,5-dimethyl-4-hydroxyphenyl)propane; 1,1-bis(4-hydroxyphenyl)cyclohexane; 1,1-bis(3,5-dimethyl4-hydroxyphenyl)cyclohexane; 1,1-bis(4-hydroxyphenyl) decane; 1,4-bis(4hydroxyphenyl)propane; 1,1-bis(4-hydroxyphenyl)cyclododecane; 1,1-bis(3,5-dimethyl4-hydroxyphenyl)cyclododecane; 4,4-dihydroxydiphenyl ether; 4,4-thiodiphenol; 4,4-dihydroxy-3,3-dichlorodiphenyl ether; and 4,4-dihydroxy-2,5-dihydroxydiphenyl ether, etc. These compounds may be used singly or in combination. In addition, compounds with three or more phenolic hydroxy groups may be used.

Alternatively, component (A) may be an aromatic copolyester carbonate. In addition to carbonate units originating in universally known aromatic diols, such compounds also have ester units originating in aromatic diols and aliphatic dicarboxylic acids with 6 to 18 carbon atoms. The phosgene method or melt method, which are universally known as methods of manufacturing aromatic polycarbonates, may be used to manufacture such compounds (see U.S. Pat. No. 4,238,596, U.S. Pat. No. 4,238,597 and U.S. Pat. No. 3,169,121).

The abovementioned (B) sulfonic acid phosphonium salt used in the present invention is expressed, for example, by the following formula

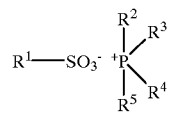

In the above formula, $R^1$ indicates an alkyl group with 1 to 40 carbon atoms or an aryl group with 6 to 40 carbon atoms, and $R^2$, $R^3$, $R^4$ and $R^5$ each independently indicate a group selected from a set consisting of hydrogen atoms, alkyl groups with 1 to 10 carbon atoms and aryl groups with 1 to 10 carbon atoms. Here, the term alkyl group includes linear, branched and cyclic alkyl groups. Furthermore, the term aryl group includes alkylaryl and arylalkyl groups. Furthermore, such alkyl groups and aryl groups may be substituted by optional groups.

Examples of alkyl groups which may occur as $R^1$ include dodecyl groups, decyl groups, butyl groups and ethyl groups, etc. Examples of aryl groups include dodecylphenyl groups, phenyl groups, benzyl groups, phenethyl groups, tolyl groups and xylyl groups, etc. $R^1$ is preferably an aryl group.

Examples of alkyl groups which may occur as $R^2$ through $R^5$ include methyl, ethyl, propyl and butyl groups, etc. Examples of aryl groups include phenyl groups, benzyl groups, phenethyl groups, tolyl groups and xylyl groups, etc.

Examples of desirable sulfonic acid phosphonium salts include tetraalkylphosphonium salts of dodecylsulfonic acid, and tetraalkylphosphonium salts of dodecylbenzenesulfonic acid, etc.

Component (B) is used in an amount which is at least 0.0001 parts by weight or more, preferably 0.0005 parts by weight or more, per 100 parts by weight of component (A) but less then 0.1 parts by weight, preferably less than 0.08 parts by weight, per 100 parts by weight of component (A). If the amount of component (B) that is used is too small, the effect of the invention cannot be obtained. On the other hand, if the amount used is too large, the weather resistance deteriorates; furthermore, discoloration occurs, the mechanical strength drops, and the external appearance of the molded article may be unsatisfactory.

In a resin composition containing the abovementioned components (A) and (B), contamination of molded articles in an amorphous pattern is suppressed while a superior transparency, weather resistance and mechanical strength are maintained.

The present invention also discloses a resin composition which contains (C) an ultraviolet absorbing agent in addition to the above mentioned components (A) and (B).

Any ultraviolet absorbing agent customarily used in PC resin compositions may be used as the above mentioned (C) ultraviolet absorbing agent. For example, benzotriazole type ultraviolet absorbing agents, benzophenone type ultraviolet absorbing agents or salicylate type ultraviolet absorbing agents, etc., may be used. Examples of benzotriazole type ultraviolet absorbing agents include 2-(2'-hydroxy-5'-methylphenyl)benzotriazole, 2-(2'-hydroxy-5'-t-butylphenyl)benzotriazole, 2-(2'-hydroxy-5'-t-octylphenyl) benzotriazole, 2-(2'-hydroxy-3',5'-di-t-butylphenyl) benzotriazole, 2-(2'-hydroxy-3',5'-di-amylbutylphenyl) benzotriazole, 2-(2'-hydroxy-3'-dodecyl-5'-methylphenyl) benzotriazole, 2-(2'-hydroxy-3',5'-dicumylphenyl) benzotriazole and 2,2'-methylenebis[4-(1,1,3,3-tetramethylbutyl)-6-(2H-benzotriazol-2-yl)phenol], etc. For example, a benzotriazole type ultraviolet absorbing agent is marketed by American Cyanamid Co. as UV5411. Furthermore, a benzophenone type ultraviolet absorbing agent is marketed by American Cyanamid Co. as UV531. Examples of salicylate type ultraviolet absorbing agents include phenyl salicylate, p-t-butylphenyl salicylate and p-octylphenyl salicylate, etc.

Component (C) is used in an amount which is at least 0.01 parts by weight or more, preferably 0.05 parts by weight or more, per 100 parts by weight of component (A) but less than 10 parts by weight or less, preferably 5 parts by weight or less, per 100 parts by weight of component (A). If the amount of component (C) that is used is too small, the light resistance deteriorates; on the other hand, if the amount used is too large, the heat resistance of the resin composition drops.

By combining the three components mentioned above, it is possible to obtain a resin composition in which contamination of molded articles in an amorphous pattern is suppressed while a superior transparency, weather resistance and mechanical strength are maintained.

Any of the resin compositions of the present invention may also contain phosphorus type stabilizers as optional components in addition to the abovementioned components. For example, any of various stabilizers marked by various makers of stabilizers as oxidation inhibitors may be used as such phosphorus type stabilizers. Concrete examples of compounds which can be used include triphenyl phosphite, diphenylnonyl phosphite, tris(2,4-di-t-butylphenyl) phosphite, trisnonylphenyl phosphite, diphenylisooctyl phosphite, 2,2'-methylenebis (4,6-di-t-butylphenyl)octyl phosphite, diphenylisodecyl phosphite, diphenylmono (tridecyl) phosphite, 2,2'-ethylidenebis(4,6-di-t-butylphenol) fluorophosphite, phenyldiisodecyl phosphite, phenyldi(tridecyl) phosphite, tris(2-ethylhexyl) phosphite, tris(isodecyl) phosphite, tris(tridecyl) phosphite, dibutyl hydrogenphosphite, trilauryl trithiophosphite, tetrakis(2,4-di-t-butylphenyl)4,4'-biphenylene diphosphite, 4,4'-isopropylidenediphenol alkyl ($C_{12}$–$C_{15}$) phosphites, 4,4'-butylidenebis(3-methyl-6-t-butylphenyl)ditridecyl phosphite, bis(2,4-di-t-butylphenyl) pentaerythritol diphosphite, bis(2,6-di-t-butyl4-methylphenyl) pentaerythritol diphosphite, bis(nonylphenyl)pentaerythritol diphosphite, distearyl-pentaerythritol diphosphite, phenyl-bisphenol A pentaerythritol diphosphite, tetraphenyldipropylene glycol diphosphite, 1,1,3-tris (2-methyl4-di-tridecylphosphite-5-t-butylphenyl)butane and 3,4,5,6-dibenzo-1,2-oxaphosphan-2-oxide, etc.

Available commercial products include Adekastab PEP-36, PEP-24, PEP-4C and PEP-8 (all trademarks, manufactured by Asahi Denka Kogyo K.K.), Irgafos 168 (trademark, manufactured by Ciba-Geigy Co.), Sandstab P-EPQ (trademark, manufactured by Sandoz Co.), Chelex L (trademark, manufactured by Sakai Kagaku Kogyo K.K.), 3P2S (trademark, manufactured by Ihara Chemical Kogyo K.K.), Mark 329K and Mark P (both trademarks, manufactured by Asahi Denka Kogyo K.K.) and Weston 618 (trademark, manufactured by Sanko Kagaku K.K.), etc.

It is desirable that phosphorus type stabilizers be added at the rate of 0.0001 to 1 parts by weight, preferably 0.001 to 0.5 parts by weight, per 100 parts by weight of PC resin.

Furthermore, hindered phenol type oxidation inhibitors, epoxy type stabilizers and sulfur type stabilizers, etc., may also be added. Examples of hindered phenol type oxidation inhibitors include n-octadecyl-3-(3',5'-di-t-butyl4-hydroxyphenyl) propionate, 2,6-di-t-butyl4-hydroxymethylphenol, 2,2'-methylenebis (4-methyl-6-t-butylphenol) and pentaerythritol-tetrakis[3-(3,5-di-t-butyl4-hydroxyphenyl)propionate, etc. Examples of epoxy type stabilizers include epoxidized soybean oil, epoxidized linseed oil, phenylglycidyl ether, allylglycidyl ether and 3,4-epoxycyclohexylmethyl-3',4'-epoxycyclohexane carboxylate, etc.

Furthermore, mold release agents may be added for the purpose of improving mold release characteristics. Examples of desirable mold release agents include silicon type mold release agents such as methylphenylsilicone oil, etc., and ester type mold release agents or olefin type mold release agents such as pentaerythritol tetrastearate, glycerol monostearate, montan acid wax and poly-alpha-olefins, etc.

Other customary additives may be added to all of the resin compositions of the present invention at the time of mixing or molding of the resin in amounts as necessary which do not have any deleterious effect on physical properties. For example, coloring agents (pigments or dyes), reinforcing agents (glass fibers, carbon fibers, etc.), filers (carbon black, silica, titanium oxide, etc.), heat-resistant agents, oxidation inhibitors, weather-proofing agents, lubricants, mold release agents, plasticizer, flame retarding agents and fluidity enhancing agents, etc., may be added. Furthermore, dyes may be added in order to ameliorate yellowness in the blue direction.

There are no particular restrictions on the method used to manufacture the resin composition of the present invention; ordinary methods can be satisfactorily used. Generally, however, a melt mixing method is desirable. Small amounts of solvents may be used, but are generally not necessary. Examples of apparatus which can be used include especially extruders, Banbury mixers, rollers and kneaders, etc. Such machines may be operated in a batch operation or continuously. There are no particular restrictions on the order in which the components are mixed.

EXAMPLES

Below, the present invention will be described in greater detail in terms of working examples. However, the present invention is not limited to these examples.

Furthermore, the following substances were used in the working examples and comparative examples:
Component (A)
PC: polycarbonate, manufactured by Nippon GE Plastics K.K., trademark: LEXAN (intrinsic viscosity measured at 25° C. in methylene chloride: 0.50 dl/g).
Component (B)
Sulfonic acid phosphonium salt: dodecylbenzene sulfonic acid tetrabutylphosphonium salt, manufactured by Takemoto Yushi K.K., trademark: EPA202.
Component (C)
Ultraviolet absorbing agent: benzotriazole type ultraviolet absorbing agent, 2-(2-hydroxy-5-t-octylphenyl) benzotriazole, manufactured by American Cyanamid Co., CYASORB UV5411.
Optional Components
Phosphorous acid ester: tris-(2,4-di-t-butylphenyl) phosphite, manufactured by Ciba-Geigy Co., Irgafos 168 (commercial name).
Hindered phenol type oxidation inhibitor: n-octadecyl-3 (3',51-di-t-butyl-4-hydroxyphenyl) propionate, manufactured by Asahi Denka Kogyo K.K., Adekastab AO-50.
Epoxy stabilizer: 3,4-epoxycyclohexylmethyl-3',4'-epoxycyclohexane carboxylate, manufactured by Daiseru Kagaku Kogyo K.K., Seroxide 2021 P.

Furthermore, the various tests and evaluations performed in the examples and comparative examples were performed as follows:
(1) Total Light Transmissivity The total light transmissivity was measured according to ASTM D1003 for a 50 mm×50 mm×3 mm flat-plate injection-molded sample.
(2) Izod Impact Strength The Izod impact strength was measured using a ⅛-inch notch according to ASTM D256.
(3) Surface Resistance The surface resistance was measured according to ASTM D257 for a 50 mm ×50 mm×3 mm flat-plate injection-molded sample.
(4) Weather Resistance Test The discoloration (yellow index) after 1000 hours was measured using a fade-o-meter weather resistance tester (manufactured by Atlas Co.) for a 50 mm×50 mm×3 mm flat-plate injection-molded sample. Delta YI indicates the difference between the YI value after 1000 hours and the initial YI.
(5) Residence Discoloration Following residence for 10 minutes at a molding temperature of 280° C. and a mold temperature of 80° C., a 50 mm×50 mm×3 mm flat plate was injection-molded, and the change in the yellow index was measured.
(6) Surface Contamination of Molded Article A box-form molded article (length 85 mm×width 200 mm×depth 15 mm, thickness 3 mm) which was injection-molded at a molding temperature of 280° C. (set) and a mold temperature of 80° C. (set) was allowed to stand indoors for 1 month (30 days), after which surface contamination was observed by visual inspection. In cases where the surface of the molded article showed contamination in an amorphous pattern (fern leaf pattern or tree branch pattern as shown in FIG. 1), contamination was considered to be "present".

Examples 1 Through 4 and Comparative Examples 1 Through 4

In each case, the respective components were mixed in the proportions (weight ratio) shown in Table 1, and pellets were manufactured by extrusion using a single-shaft extruder (65 mm) set at 280° C., 100 rpm, 60 kg/hr (extrusion speed). Using the pellets thus obtained, injection molding was performed at a set temperature of 280° C. and a mold temperature of 80° C. The molded articles thus obtained were subjected to various tests. The results are shown in Table 1.

TABLE 1

|  | Working Example | | | | Comparative Example | | | |
| --- | --- | --- | --- | --- | --- | --- | --- | --- |
|  | 1 | 2 | 3 | 4 | 1 | 2 | 3 | 4 |
| Components (parts by weight) | | | | | | | | |
| PC | 100 | 100 | 100 | 100 | 100 | 100 | 100 | 100 |
| Sulfonic acid phosphonium salt | 0.001 | 0.01 | 0.05 | 0.075 | 0.15 | 0.3 | 1 | — |
| Ultraviolet absorbing agent | 0.3 | 0.3 | 0.3 | 0.3 | 0.3 | 0.3 | 0.3 | 0.3 |
| Phosphorous acid ester | 0.08 | 0.08 | 0.08 | 0.08 | 0.08 | 0.08 | 0.08 | 0.08 |
| Hindered phenol | 0.02 | 0.02 | 0.02 | 0.02 | 0.02 | 0.02 | 0.02 | 0.02 |
| Epoxy stabilizer | 0.02 | 0.02 | 0.02 | 0.02 | 0.02 | 0.02 | 0.02 | 0.02 |
| Evaluations | | | | | | | | |
| Total light transmissivity (%) | 89 | 89 | 89 | 89 | 89 | 89 | 89 | 89 |
| Izod impact strength | 60 | 60 | 60 | 60 | 60 | 60 | 60 | 60 |

TABLE 1-continued

|  | Working Example | | | | Comparative Example | | | |
| --- | --- | --- | --- | --- | --- | --- | --- | --- |
|  | 1 | 2 | 3 | 4 | 1 | 2 | 3 | 4 |
| (kg-cm/cm) | | | | | | | | |
| Surface resistances (ohms) | $1 \times 10^{15}$ | $1 \times 10^{15}$ | $1 \times 10^{15}$ | $1 \times 10^{15}$ | $8 \times 10^{14}$ | $5 \times 10^{14}$ | $2 \times 10^{12}$ | $1 \times 10^{15}$ |
| Delta YI (residence discoloration) | 1.2 | 1.2 | 1.4 | 1.9 | 3.1 | 4.3 | 7 | 1.2 |
| Delta YI (weather resistance test) | 2.3 | 2.4 | 2.4 | 2.5 | 3.7 | 4.2 | 2.8 | 2.4 |
| Surface Contamination | Absent | Absent | Absent | Absent | Absent | Absent | Absent | Present |

The polycarbonate resin composition of the present invention tends not to show amorphous-pattern contamination on the surfaces of molded articles, and is superior in terms of transparency, mechanical strength and weather resistance, etc. Accordingly, the resin composition of the present invention is especially useful in applications such as automobile head lamp lenses, covers and lenses for various illuminating devices, transparent films and transparent sheets, optical disks and optical disk cartridges, various parts used in office equipment and household appliances, and case materials used for storage or transportation, etc.

We claim:

1. A polycarbonate resin comprising (A) 100 parts by weight of a polycarbonate resin and (B) from less than 0.0001 parts by weight to about 0.1 parts by weight of a sulfonic acid phosphonium salt.

2. The resin of claim 1, in which the amount of (B) is from to about 0.0005 to 0.08 parts by weight.

3. The resin of claim 1 in which (B) is expressed by the following formula:

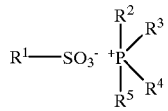

wherein $R^1$ indicates an alkyl group with 1 to 40 carbon atoms or an aryl group with 6 to 40 carbon atoms, and $R^2$, $R^3$, $R^4$ and $R^5$ each independently indicate a group selected from a group consisting of hydrogen atoms, alkyl groups with 1 to 10 carbon atoms and aryl groups with 1 to 10 carbon atoms.

4. The resin of claim 1 which additionally comprises (C) from about 0.01 to about 10 parts by weight of an ultraviolet absorbing agent.

5. A molded article consisting of the resin of claim 1.

6. The molded article of claim 5 which is an automobile head lamp lens.

7. The resin of claim 1 in which (A) is a polycarbonate resin made by the melt process from bisphenol-A and diphenyl carbonate.

8. A polycarbonate resin consisting essentially of (A) 100 parts by weight of a polycarbonate resin and (B) from about 0.0005 parts by weight to about 0.08 parts by weight of a sulfonic acid phosphonium salt of the formula:

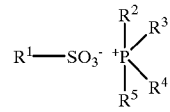

wherein $R^1$ indicates an alkyl group with 1 to 40 carbon atoms or an aryl group with 6 to 40 carbon atoms, and $R^2$, $R^3$, $R^4$ and $R^5$ each independently indicate a group selected from a group consisting of hydrogen atoms, alkyl groups with 1 to 10 carbon atoms and aryl groups with 1 to 10 carbon atoms.

9. A molded article consisting of the resin of claim 8 which is an automobile head lamp lens.

10. The resin of claim 8 in which (A) is a polycarbonate resin made by the melt process from bisphenol-A and diphenyl carbonate.

11. A polycarbonate resin consisting essentially of (A) 100 parts by weight of a polycarbonate resin, (B) from about 0.0005 parts by weight to about 0.08 parts by weight of a sulfonic acid phosphonium salt of the formula:

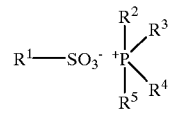

wherein $R^1$ indicates an alkyl group with 1 to 40 carbon atoms or an aryl group with 6 to 40 carbon atoms, and $R^2$, $R^3$, $R^4$ and $R^5$ each independently indicate a group selected from a group consisting of hydrogen atoms, alkyl groups with 1 to 10 carbon atoms and aryl groups with 1 to 10 carbon atoms and (C) from about 0.01 to about 10 parts by weight of an ultraviolet absorbing agent.

12. A molded article consisting of the resin of claim 11 which is an automobile head lamp lens.

13. The resin of claim 11 which additionally contains (D) a phosphate type stabilizer in the amount of from about 0.0001 to about 1 part by weight per 100 parts by weight of (A).

14. A molded article consisting of the resin of claim 13 which is an automobile head lamp lens.

15. The resin of claim 11 in which (A) is a polycarbonate resin made by the melt process from bisphenol-A and diphenyl carbonate.

16. A polycarbonate resin comprising (H) 100 parts by weight of a polycarbonate resin and (B) from about 0.0001 parts by weight to less than 0.1 parts by weight of a sulfonic acid phosphonium salt, wherein the delta YI is 2.5 or less.

* * * * *